(12) United States Patent
Abraham

(10) Patent No.: US 9,019,296 B1
(45) Date of Patent: Apr. 28, 2015

(54) CUSTOMIZED COLOR SELECTION FOR A DESIGN PROJECT

(75) Inventor: Barry Abraham, Kirkland, WA (US)

(73) Assignee: Pure Home Corporation, Kirkland, WA (US)

(*) Notice: Subject to any disclaimer, the term of this patent is extended or adjusted under 35 U.S.C. 154(b) by 352 days.

(21) Appl. No.: 13/300,420

(22) Filed: Nov. 18, 2011

Related U.S. Application Data

(60) Provisional application No. 61/415,794, filed on Nov. 19, 2010.

(51) Int. Cl.
*G09G 5/02* (2006.01)
*G06Q 30/02* (2012.01)
*H04N 101/00* (2006.01)

(52) U.S. Cl.
CPC ............ *G06Q 30/02* (2013.01); *H04N 2101/00* (2013.01)

(58) Field of Classification Search
CPC .. G06Q 30/02; G06T 11/001; H04N 2101/00; H04N 5/232; H04N 9/045
See application file for complete search history.

(56) References Cited

U.S. PATENT DOCUMENTS

| | | | | |
|---|---|---|---|---|
| 5,615,320 | A | * | 3/1997 | Lavendel ...................... 345/594 |
| 2006/0066629 | A1 | * | 3/2006 | Norlander et al. ............ 345/594 |
| 2007/0213948 | A1 | * | 9/2007 | Hornstein ...................... 702/81 |

* cited by examiner

*Primary Examiner* — Kimbinh T Nguyen
*Assistant Examiner* — Raffi Isanians
(74) *Attorney, Agent, or Firm* — Fenwick & West LLP

(57) ABSTRACT

A customized design service enables a user to customize color selection for a design project. The service receives multiple inputs from the user for a set of preselected topics (e.g., color, style and mood) associated with the design project. Based on the user inputs, the service develops a user compatibility profile for the project. The service selects a palette of potential colors for the design project responsive to the user's compatibility profile using a regression-based analysis of the compatibility profile and an expert color palette. The service derives a user's signature color palette for the design project based on the palette of potential colors. The service further offers products to the user that are compatible with the user's compatibility profile and the signature color palette.

22 Claims, 6 Drawing Sheets

CUSTOMIZED COLOR SELECTION FOR A DESIGN PROJECT

CROSS-REFERENCE TO RELATED APPLICATIONS

The application claims the benefit of U.S. Provisional Application No. 61/415,794, filed Nov. 19, 2010, which is incorporated herein by reference in its entirety.

BACKGROUND

The invention relates generally to customized design services, and more particularly to customized color selection for a design project.

Color is an expression of human emotion and proper use of color within a room has a significant psychotherapeutic value. For example, color can define human mood (e.g., happy, secure) and self-expression (e.g., unpredictable, comfortable). A decision to choose a color over another color has an emotional context as to why the color was picked. Additionally, color is central to home improvement, workspace, decor, fashion and other design projects.

Color and proper selection of color can be a communication problem between a buyer and a seller within many industries, especially in design services (e.g., customized decor services). For example, assume a buyer wants to paint a dining room wall and a home improvement supplier has an inventory of over 3,500 potential colors for the wall. Although the home improvement supplier can provide samples and technical details for each paint, often the home improvement supplier cannot help the buyer to pick a color that fulfills the buyer's desires for the wall.

One reason for the communications problem between the buyer and the seller is the difficulty of expressing the relationship between human emotions and colors. Most humans are unable to explicitly express their inner emotional needs and desires and translate these variables into a color or a palette of colors. Furthermore, sellers are unable to translate the buyers' self-expression to a cohesive set of colors or a palette of colors. The resulting breakdown in communications results in a prolonged color selection process, misapplication of colors, waste of resources and generally unsatisfactory results for the design project. For example, merchants provide products whose colors do not match a buyer's style and/or emotion.

SUMMARY

The above and other issues are addressed by a method, system and computer program product for customizing a user design project.

One aspect provides a computer-implemented method for customizing a user design project. Embodiments of the method comprise developing a compatibility profile for the user based on a set of inputs from the user for a set of preselected topics (e.g., style, mood, color, etc.) associated with the design project. The method selects a palette of potential colors for the design project responsive to the user's compatibility profile and derives a signature color palette for the design project responsive to the palette of potential colors. The method stores the signature color palette and the compatibility profile in association with the design project.

Another aspect provides a computer system for customizing a user design project. The system comprises a non-transitory computer-readable storage medium storing executable program code. The code is for performing steps comprising developing a compatibility profile for the user based on a set of inputs from the user for a set of preselected topics associated with the design project, selecting a palette of potential colors for the design project responsive to the user's compatibility profile, deriving a signature color palette for the design project responsive to the palette of potential colors and storing the signature color palette and the compatibility profile in association with the design project. The computer system comprises a computer processor for executing the program code.

Still another aspect provides a non-transitory computer-readable storage medium storing executable computer program instructions for customizing a user design project. The computer-readable storage medium stores computer program instructions for developing a compatibility profile for the user based a set of inputs from the user for a set of preselected topics associated with the design project. The computer-readable storage medium further stores computer program instructions for selecting a palette of potential colors for the design project responsive to the user's compatibility profile, and for deriving a signature color palette for the design project responsive to the palette of potential colors. The signature color palette for the design project and the compatibility profile are stored in association with the design project.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

Figure 1:
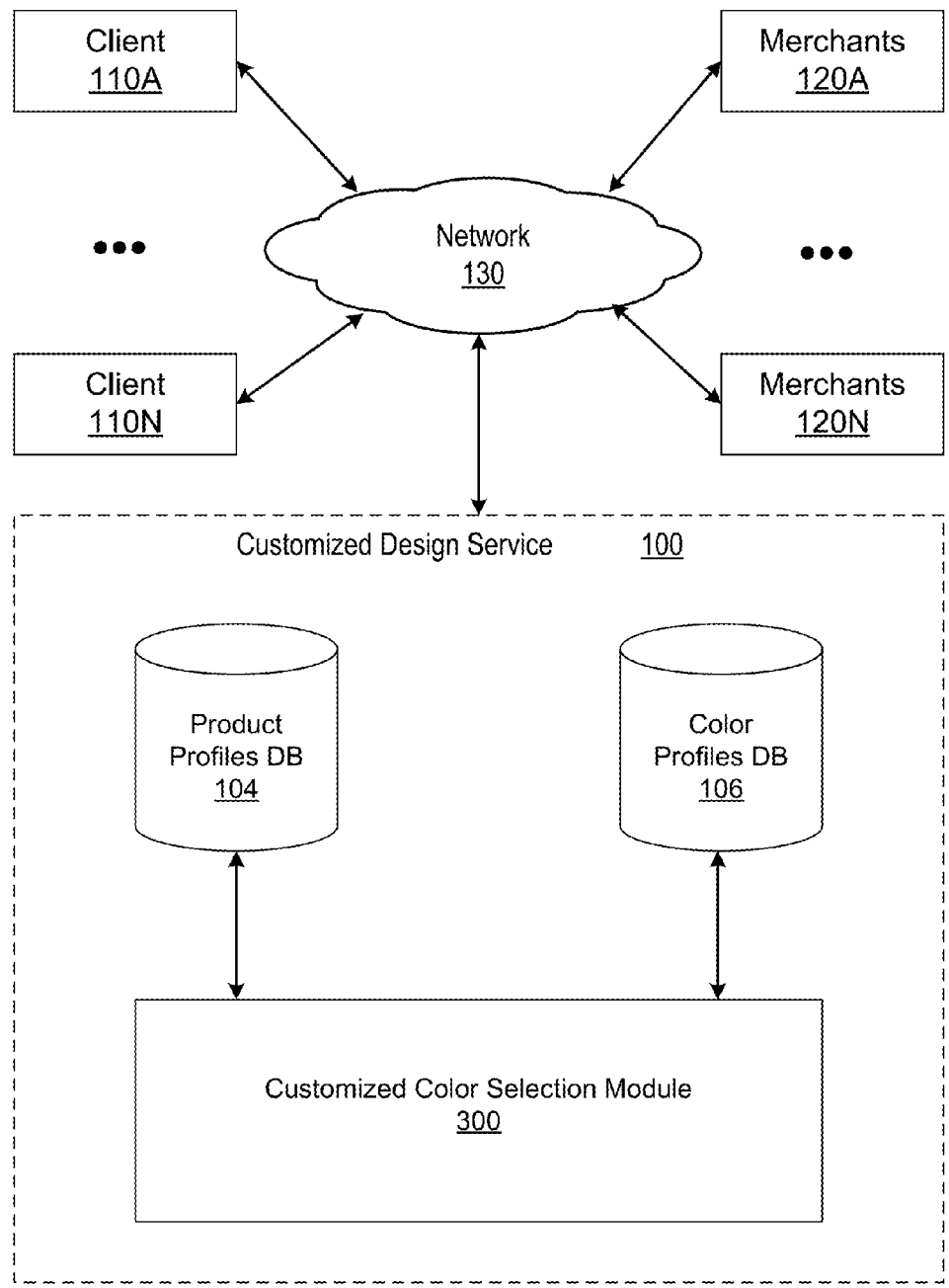
FIG. 1 is a block diagram illustrating an environment providing a customized design service.

FIG. 1 is a block diagram illustrating an environment providing a customized design service 100. FIG. 1 illustrates that multiple clients 110 and merchants 120 communicate with the service 100 via a network 130. Only two clients 110 and two merchants 120 are shown in FIG. 1 in order to simplify and clarify the description. Embodiments of the computing environment can have many clients 110 and merchants 120 connected to the customized design service 100 via the network 130.

A user uses a client 110 to interact with the customized design service 100 to establish a compatibility profile and a signature color palette containing one or more colors for a design project. The client 110 is an electronic device used by a user to communicate with the customized design service 100 and/or other entities on the network 130. In one embodiment, the client 110 is a personal computer (PC) such as a desktop, notebook, or tablet computer. In other embodiments, the client 110 is a mobile telephone, personal digital assistant, television set-top box, or other device. The client 110 includes a monitor, touch screen, or other form of display device on which it can display visual information, and a web browser with which it can exchange information with the customized design service 100.

The merchants 120 are suppliers of items to design-related markets such as the home improvement, new construction, interior design, apparel and automotive markets. The items may include products, services, and digital content. The merchants 120 use computers or other electronic devices to describe their products according to attributes of a marketing profile established by the customized design service 100. For example, if a merchant offers a couch having a particular color and style, the merchant configures the attributes of the marketing profile to indicate the color and style of the couch.

The customized design service 100 includes one or more computers and uses a web server to interact with the users of the clients 110 to enable the users to establish compatibility profiles for their design projects. As part of these interactions, the users interact with a color selection module 300 to select signature color palettes for the design projects. For a particular design project associated with a particular user, the color selection module 300 receives multiple inputs related to the project to establish the user's compatibility profile. In addition, the color selection module 300 accesses expert knowledge related to color selection stored in a color profiles database 106. Based on the user's compatibility profile, and the expert knowledge in the color profiles database 106, the color selection module 300 narrows the field of millions of possible color combinations to a smaller subset of colors that are compatible with the user's compatibility profile and suitable for the design project. The user may then select from among the colors to form the user's signature color palette for the design project.

In addition, the color selection module 300 uses the user compatibility profiles and signature color palettes to offer related items, including products, services, and/or content, offered by the merchants 120 to the users. In one embodiment, the design service 100 stores marketing profiles of products, services, digital content and other items offered by the merchants in a product profiles database 104. For a given user design project, the color selection module 300 analyzes the product marketing profiles in view of the user's compatibility profile and signature color palette to identify compatible items. The color selection module 300 interacts with the user to provide descriptions of the items and to facilitate interactions with the merchants 120 to purchase selected items.

The network 130 enables communications between the clients 110, the merchants 120 and the customized design service 100. In one embodiment, the network 130 is the Internet, and uses standardized internetworking communication technologies and protocols.

Figure 2:
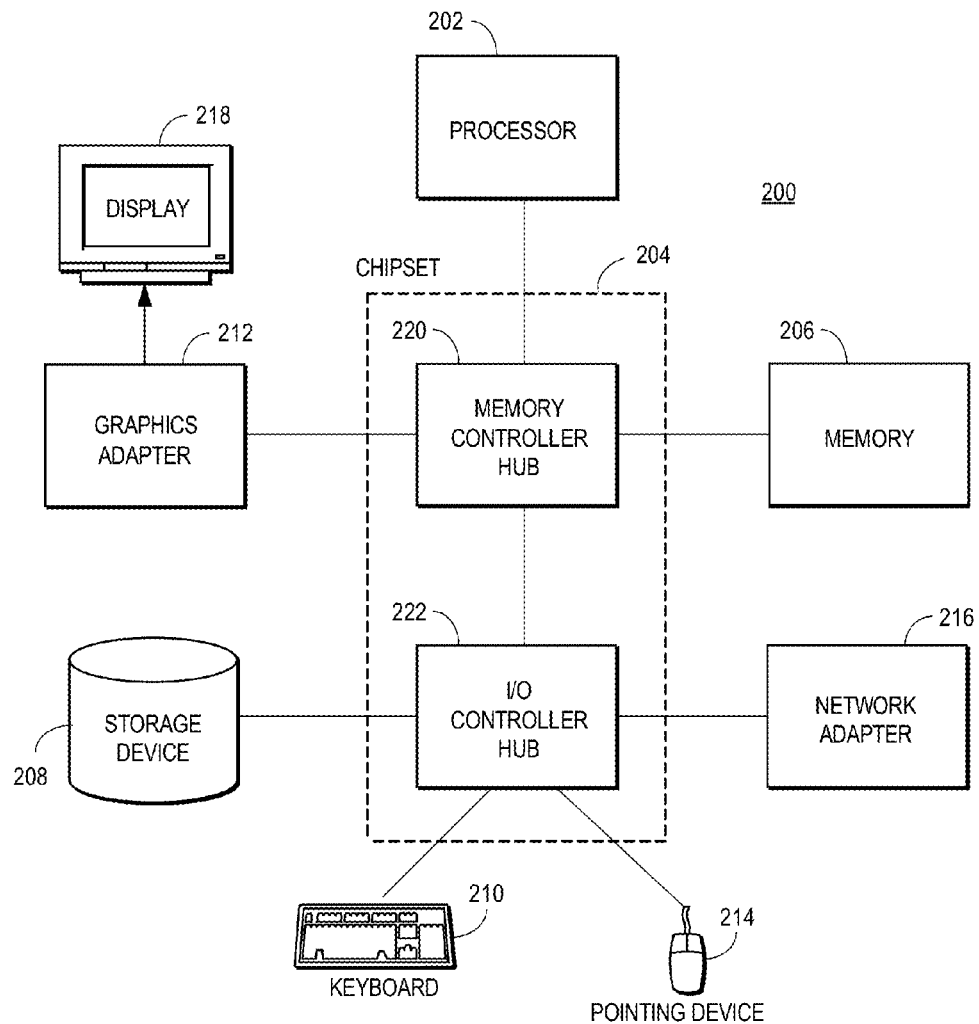
FIG. 2 is a high-level block diagram of a computer for acting as a client, a merchant, and/or the customized design service.

FIG. 2 is a high-level block diagram of a computer 200 for acting as a client 110, a merchant 120, and/or the customized design service 100. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the network 120.

As is known in the art, a computer 200 can have different and/or other components than those shown in FIG. 2. In addition, the computer 200 can lack certain illustrated components. In one embodiment, a computer 200 acting as the customized design service 100 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
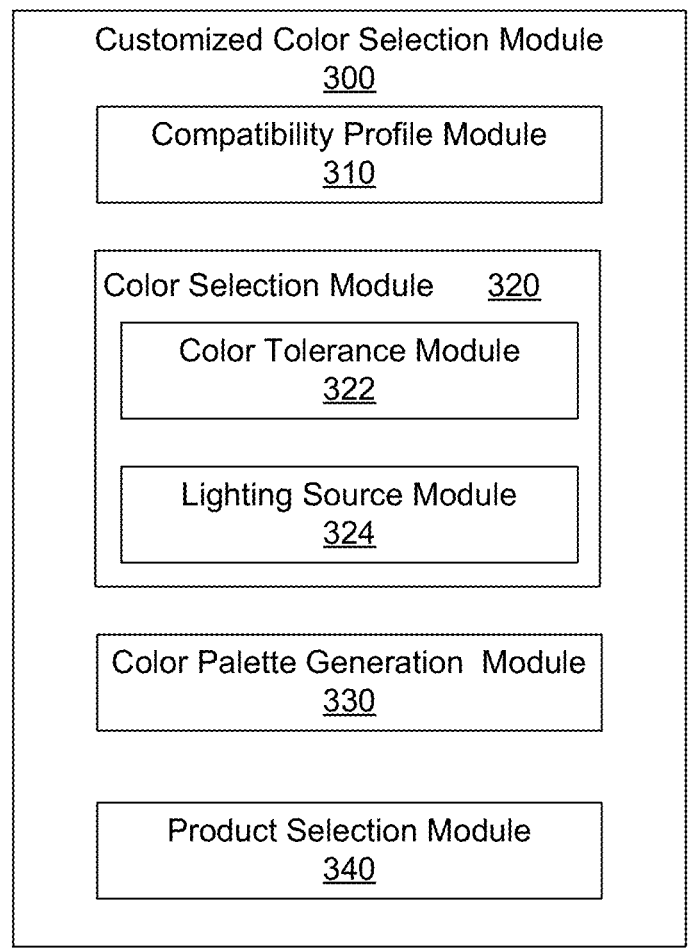
FIG. 3 is a block diagram illustrating a detailed view of the color selection module according to one embodiment.

FIG. 3 is a block diagram illustrating a more detailed view of the color selection module 300 according to one embodiment. The color selection module 300 includes a compatibility profile module 310, a color selection module 320, a color palette generation module 330 and a product selection module 340. Other embodiments can have different or additional modules, and the functionalities may be distributed among the modules in a different manner than is described herein.

The compatibility profile module 310 interacts with the user of a client 110 to develop and store a compatibility profile of the user for a design project. In one embodiment, the compatibility profile module 310 develops the compatibility profile by asking the user questions from a set of topics designed to elicit information about the user and design project. The topics may include, for example, the style that the user wants to achieve with the design project and the mood that the user seeks to create with the project. The topics may also address the user's desired color or colors for the project, the existing color elements involved in the project that will remain within the design space after completion of the project (e.g., wood species and types of hard surfaces), environmental effects such as the lighting associated with the project (e.g., natural, incandescent, halogen or fluorescent light), and the geographic location of the project (which may affect the lighting). The questions may be of a variety of types (e.g., multiple choice, selecting words from a list, selecting images from a list), the preselected topics can be answered in any order and answers to the questions may be used as data inputs to successive questions. The user's answers to the questions, and information derived to the answers, collectively form the compatibility profile.

Taking an architectural project as an example, the compatibility profile module 310 may provide a list of multiple possible styles to the user, along with associated descriptive images of the styles and request that the user select one or more of the styles for the architectural project. Examples of styles from which a user may select include Traditional, Contemporary, Coastal, Romantic, Transit, South Beach, Country, Ethnic, Pacific Northwest, Arts Craft, Cottage, Eclectic, Whimsical and Old World. A style (e.g., Traditional) may have one or more associated sub-styles that a user can select.

The compatibility profile module 310 may also provide the user with a set of descriptive attributes. The user may then select attributes from among the set that describe the mood and/or other aspects associated with the design project. Depending upon the embodiment, attributes can be exclusive to a particular style and presented to the user only if the user has previously selected the associated style. Attributes can also be associated with multiple styles or independent of any styles. For example, if the user selects the Contemporary style, the compatibility profile module 310 may ask the user to select from among the attributes "sophisticated," "trendy," "elegant," "confident," or "fashionable." Similarly, for the Ethnic style the user may select from among attributes such as "rich," "vivid," "worldly," "traveled," or "deep." The compatibility profile module 310 may present the attributes to the user as words (e.g., adjectives), images, sounds, or in other forms.

In one embodiment, the compatibility profile module 310 analyzes the user's selections to determine a dominant style for the design project. The attributes presented to the user have predetermined weights describing the attributes' relationships to the various styles. An attribute that is unique to a specific style has a relatively high weight associating the attribute with the style, thereby indicating a strong preference for the style. Attributes that are associated with multiple styles have variable weights that reflect the correlation between the attributes and the styles. Thus, an attribute that is associated with many styles may have relatively low weights for those styles to indicate that user selection of the attribute indicates only a slight preference for the styles associated with the attribute. The compatibility profile module 310 sums the weights for the various styles associated with the attributes selected by the user, and declares the style having the highest weight the dominant style for the design project. The compatibility profile module 310 may also rank the styles based on the weights if, for example, the user selects multiple styles and/or the user selects attributes associated with multiple styles.

The color selection module 320 selects potential colors for the design project based on the user's compatibility profile, color selections, and/or other factors. In one embodiment, the color selection module 320 interacts with the color profiles database 106 and uses the expert knowledge encoded therein to select the colors. The expert knowledge associates the colors represented in the color profiles database with particular styles, attributes and other information within the user's compatibility profile.

In one embodiment, the expert color profile database 106 stores a predetermined set of expert colors forming an expert color palette. Each expert color is profiled using multiple independent data points that describe the relationship between the color and potential aspects of the user's compatibility profile. For example, the data points may encompass descriptions of a color's style (i.e., the styles with which the color is associated), color chroma (i.e., purity or saturation), color value (i.e., the lightness or darkness of the color), temperature (i.e., the warmth or the coolness of the color), and undertone (i.e., the reaction of the color to light sources of various wavelengths, for example, whether the shade of a color changes when full sunlight or fluorescent lights are cast on the color), etc.

Each potential style that may be selected by the user thus has an associated palette of colors. For example, the style South Beach has a palette of cool colors (the colors in the expert palette with data points indicating that the colors are associated with the South Beach style). These colors have specific chromas, color values, and other characteristics that traditionally match the style. Likewise, the style Pacific Northwest has a palette filled with warm colors and other color values appropriate to the style.

The color selection module 320 uses the user's compatibility profile and the expert knowledge to select a palette of potential colors for the design project. In one embodiment, the color selection module 320 selects the colors associated with the user's dominant style for the palette of potential colors. The color selection module 320 may also use the ranked list of styles to select colors based on the style ranking, e.g., select colors associated with the secondary and tertiary styles. Additionally, the color selection module 320 may use the user's expressed color preferences, the identified existing color elements, and the lighting associated with the project in combination with the expert knowledge to select from among the colors in the expert color profile database 106 to form the palette of potential colors for the project.

In one embodiment, the color selection module 320 treats each of the user's answers to the compatibility profile questions as a random state input. Thus, the topics may be addressed by the user in any order as there is no required predetermined sequence of topics. For each set of answers for a topic, the color selection module 320 performs a regression-based analysis of colors in the expert color palette associated with the user compatibility profile in order to narrow the range of potential colors that match the compatibility profile. The regression-based analysis uses the user's answers to the questions in combination with the expert knowledge associated with the colors in the color profiles database 106 to find the colors that best match the user's answers. For example, if the user's answers indicate that the Pacific Northwest style is dominant, and the Classic style is secondary, the regression-based analysis performed by the color selection module 320 will narrow the palette to a set of potential colors that primarily reflect the influence of the Pacific Northwest style but also share colors associated with the Classic style. The color selection module 320 uses the regression-based analysis to continuously reduce the range of potential colors as the user provides new inputs, thereby ultimately reducing the potential color palette from millions of colors, to hundreds of colors, and then to tens of colors.

In one embodiment, the color selection module 320 includes a color tolerance module 322 that determines the user's color tolerance and a lighting source module 324 that influences the determination of the user's color tolerance based on the lighting associated with the project. Color tolerance describes the user's ability or willingness to use a variety of colors or locations of colors for the design project. In one embodiment, the color tolerance in a design space is represented in two forms: saturation of color within the space and the quantity of different colors or colored elements within the space. The color tolerance module 322 determines user color tolerance based on user inputs in combination with expert knowledge encoded within the color tolerance module 322 and the color profiles database 106. The user's color tolerance is treated as a state input in the regression-based analysis performed by the color selection module 320 and thus impacts the colors added to the potential color palette for the design project. The user's color tolerance may be incorporated into the compatibility profile for the project or represented separately.

In one embodiment, the color tolerance module 322 asks the user a set of questions designed to elicit answers that describe the user's color tolerance. For example, the color tolerance module 322 may present the user with questions such as: "Do you gravitate towards highly saturated colors?"; "Do you like a mix of different colors?"; "Do you like main body colors with strategically placed accent walls?"; "Are you afraid of color?" and "Are you sensitive to color changes?" The color tolerance module 322 may also ask questions by presenting the users with a set of images and asking the users to select preferred images, and/or by asking the user other types of questions.

In one embodiment, the color tolerance module 322 uses the user's answers to the questions to calculate a score describing the user's color tolerance. For example, the color tolerance module 322 may assign the user's color tolerance a score between one and 10, where one indicates that the user has a low color tolerance and a 10 indicates that the user has a high color tolerance.

Figure 4A:
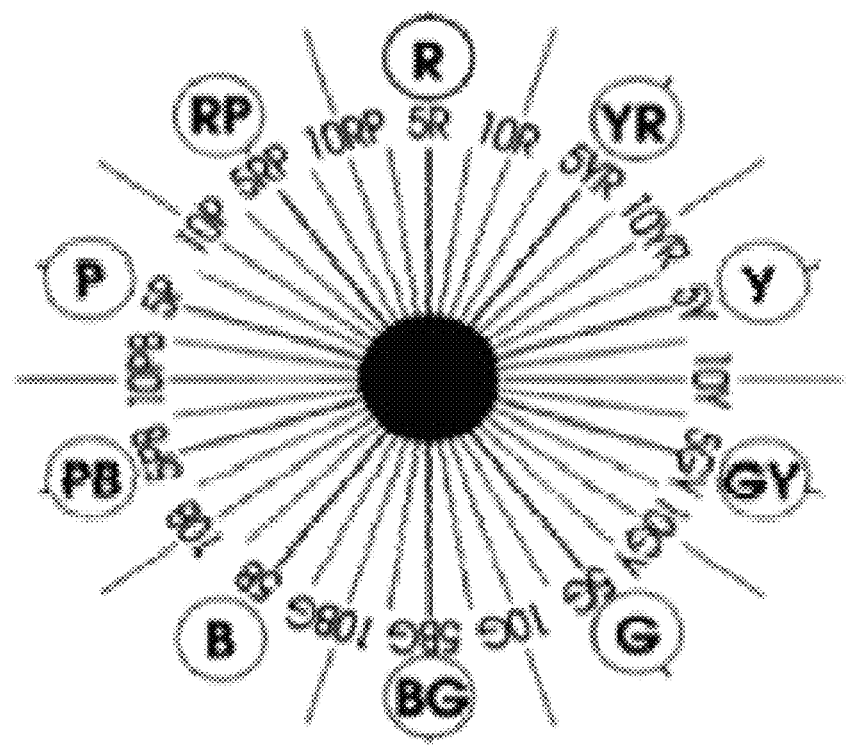
FIG. 4A is an example of the Munsell color system in the form of a Munsell color wheel.

The color tolerance module 322 uses the user's color tolerance in combination with the Munsell color system to determine a range of colors acceptable (i.e., tolerated by) the user in view of the user's compatibility profile. In the Munsell color system, a color is specified by hue, value and chroma. FIG. 4A is an example of the Munsell color system in the form of a Munsell color wheel. The Munsell color wheel in FIG. 4A divides color into five principle hues: Red (R), Yellow (Y), Green (G), Blue (B) and Purple (P), along with 5 intermediate hues halfway between adjacent principle hues, e.g., yellow-red (YR) and green-yellow (GY). Each of the 10 principle hues and intermediate hues are further divided into 10 sub-hues.

The color tolerance module 322 uses the user's color tolerance to determine the range of colors, based on the Munsell system, to include in the palette of potential colors for the user. Generally, the higher the user's color tolerance, the greater the range of colors within the Munsell system that may be included in the user's potential color palette.

Figure 4B:
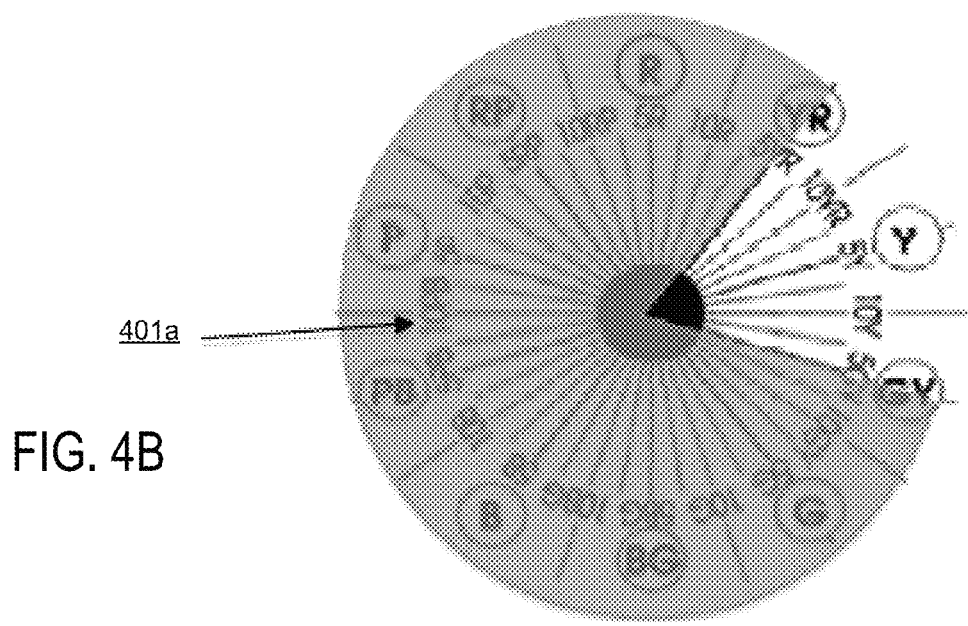
FIG. 4B is an example of the Munsell color wheel with a specified color range.
Figure 4C:
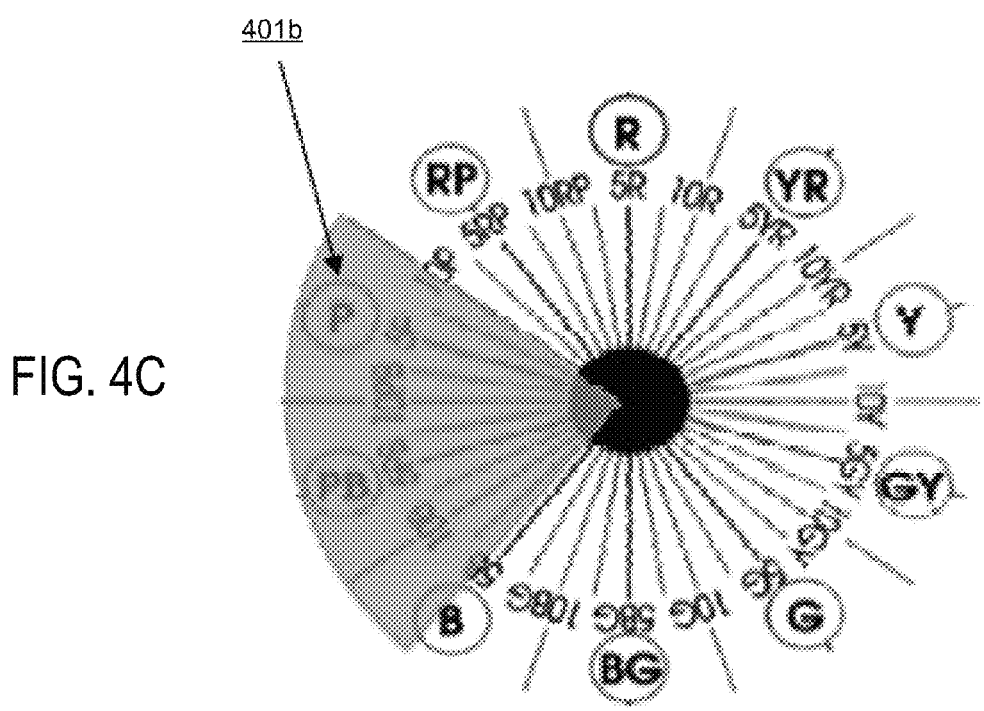
FIG. 4C is another example of the Munsell color wheel with a specified color range.

FIGS. 4B and 4C illustrate examples of Munsell color wheels with specified color ranges. FIG. 4B illustrates the color range for a user with a low color tolerance. In FIG. 4B, the shaded portion 401a of the color wheel is unusable due to the user's low color tolerance. Similarly, FIG. 4C illustrates the color range for a user with high color tolerance. In FIG. 4C, the shaded portion 401b of the color wheel is unusable due to the user's color tolerance. However, the shaded portion 401b in FIG. 4C is much smaller than the shaded portion 401a in FIG. 4B, indicating that FIG. 4C describes a higher color tolerance.

In one embodiment, the color tolerance module 322 determines the usable portion of the color range (i.e., the unshaded portions in FIGS. 4B and 4C) based on the user's expressed color preferences and/or other information within the user's compatibility profile. For example, if the user selects a yellow as the primary color for the project and the user's compatibility profile indicates a low color tolerance, the usable color range may be a narrow band centered on the yellow color.

Further, in one embodiment, the lighting source module 324 influences the usable color range produced by the color tolerance module 322 based on the lighting associated with the design project as described by the compatibility profile. Different types of light have different influences on the appearance of colors. Specifically, the lighting source influences the undertone of a color. For example, full sunlight includes red hues lighting components that will make yellow objects appear more orange. Additionally, the character of the sunlight will change based on the direction of exposure, latitude of the design project, and time of day. Similarly, fluorescent lighting includes blue hues lighting components that will make a yellow object appear more green.

The lighting source module 324 therefore adjusts the usable color tolerance range to account for these types of lighting influences. In one embodiment, the lighting source module 324 expands the color tolerance range in one or more direction produced by the types of lighting involved in the project. For example, if the color tolerance module 322 identifies a narrow color band centered on yellow, and the compatibility profile indicates that the project will be lit by sunlight, the lighting source module 324 expands the color range toward red to account for the influence of the sunlight. Similarly, if the compatibility profile indicates that the project will be lit by fluorescent light, the lighting source module 324 expands the color range toward blue to account for the influence of the light. If the project is lit by sunlight by day and fluorescent light by night, the lighting source module 324 extends the color range in both the red and blue directions. FIG. 4B illustrates this scenario, where the color range is centered on yellow and extends to yellow-red on one side and green-yellow on the other side.

The color palette generation module 330 derives a user's signature color palette for the design project based on the palette of potential colors. In one embodiment, the color palette generation module 330 presents the colors from the potential color palette identified by the regression-based analysis to the user and provides the user with an interface allowing the user to select colors for use within the design project. These selected colors become the signature color palette. The color palette generation module 330 stores the signature color palette in association with the user and/or project. The signature color palette may be part of the compatibility profile or represented separately.

The user's color selections may also be treated as inputs to the regression-based analysis. Thus, the potential color palette presented to the user may be further refined and narrowed by the user's selection of primary or secondary colors for the signature color palette. For example, the color palette generation module 330 may ask the user to select a primary color (a color to be used as a focal point within the design space) and one or more secondary colors (e.g., trim and accent colors), and perform a regression-based analysis to refine the potential color palette after each selection.

Further, in one embodiment the color palette generation module 330 uses the golden mean ratio when performing the regression-based analysis using the colors selected by the user. The golden ratio occurs when the ratio of the sum of two quantities to the larger quantity is equal to the ratio of the larger quantity to the smaller quantity. The color palette generation module 330 may enforce this ratio by assigning quantitative weights to the selected colors reflecting the colors' roles in the design project. For example, the color selected as the primary color may be assigned a weight that treats the primary color as the larger quantity and the secondary colors may be assigned weights that treat the colors collectively as the smaller quantity in the ratio. These weights may then be used to influence the regression-based analysis by amounts proportionate to the weights, such that the primary color has a greater influence on the analysis than the secondary colors.

In one embodiment, the color selection module 300 also includes a product selection module 340 that identifies items listed in the product profiles database 104 that are compatible with the user's compatibility profile, color tolerance, and/or the signature color palette. The marketing profiles for the items offered by merchants describe aspects of the items that are associated with information within the compatibility profiles. For example, a marketing profile may describe the category of the item (e.g., lighting, area rugs, paint furniture, case good), one or more styles and attributes with which the offered item is associated, colors in which the item is available or compatible (including primary color, color chroma, color value, undertone colors in multiple lighting spectrums), materials of construction, item durability, whether the item is for an area or a room, geographic areas in which the item is available, etc. The product selection module 340 thus compares the user's compatibility profile and related information with the marketing profiles in the product profiles database 104 to identify a set of compatible items. This process treats the user's compatibility profile and related information as a contextual profile of the user and performs a contextual search of the items offered by the merchants.

The product selection module 340 presents the compatible products to the user. This presentation may occur in response to a specific query from the user. For example, the user may make a query for bedroom furnishings that are compatible with the user's signature color palette, in which case the product selection module 340 will search in the product profiles database 104 to identify a set of compatible furnishings and display the furnishings to the user. The presentation may also occur without receiving an explicit query from the user. For example, the product selection module 340 may automatically identify and display a set of compatible items at intermediate stages when the user is establishing a compatibility profile, selecting a signature color palette, and/or viewing the signature color palette.

Further, an embodiment of the product selection module 340 includes functionality allowing the user to purchase the products offered by the merchants. For example, the product selection module 340 may collect payment information from the user and then interact with the merchant 120 to effect the purchase. The product selection module 340 may also direct the user to the merchant 120 so that the user can purchase the product directly from the merchant 120.

In one embodiment, the user's interactions with the product selection module 340 are incorporated into the user's compatibility profile. Thus, data describing the items searched-for, viewed, and purchased by the user, as well as data provided by the user while engaging in these activities, are stored in the user's compatibility profile. The data can therefore influence the regression-based analysis and thereby influence the potential color palette and subsequent selections made by the product selection module 340.

Figure 5:
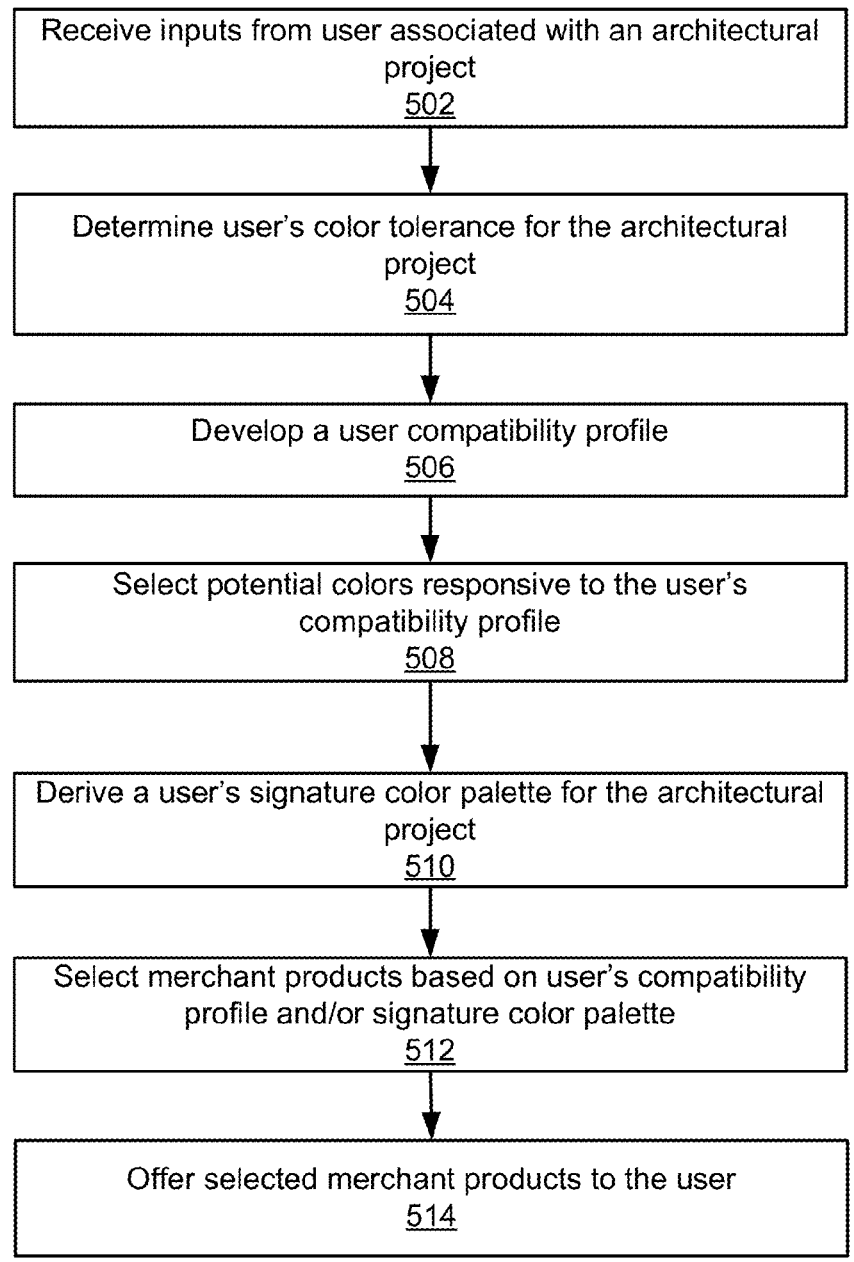
FIG. 5 is a flow chart illustrating a method of customizing a user design project according to one embodiment.

FIG. 5 is a flow chart illustrating a method of customizing a user design project according to one embodiment. Other embodiments may perform the illustrated steps in different orders and may include different or additional steps.

The color selection module 300 interacts with the user to receive 502 multiple inputs for a set of preselected topics associated with the design project. The preselected topics relate to aspects of the project including the project's color, style, and mood, existing elements, and lighting. The color selection module 300 also interacts with the user to determine 504 the user's color tolerance as influenced by the project's lighting. Based on the user inputs, the color selection module 300 develops 506 a user compatibility profile for the design project.

The color selection module 300 selects 508 potential colors for the design project responsive to the user's compatibility profile. For example, the color selection module 300 may perform a regression-based analysis of colors in an expert color palette using the user's compatibility profile in order to narrow the range of potential colors that match the compatibility profile. The color selection module 300 derives 510 the user's signature color palette for the design project based on the palette of potential colors. In one embodiment, the color selection module 300 displays potential colors that match the compatibility profile to the user and allows the user to select primary and/or secondary colors for the project. The user's color selections may be included in the regression-based analysis to further refine the palette of potential colors.

The color selection module 300 further selects 512 compatible merchant products for the design project based on the user's compatibility profile, color tolerance and/or user's signature color palette from a product profile database. The product profile database stores marketing profiles for items offered by merchants, where the marketing profiles describe aspects of the items that are associated with information within the compatibility profiles. The color selection module 300 offers 514 the selected merchant products to the user.

The customized design service 100 accordingly bridges the communication gap between buyers and sellers. Not only does the customized design service 100 assist users in selecting colors for a design project, but it also builds a compatibility profile for the user that can be used for functions such as real-time contextual search for advertising and product recommendations. Moreover, the compatibility profiles of multiple users collectively describe consumption patterns, inclinations and tastes of a broad population of people in real-time. Merchants may use these consumption patterns to quickly adjust their product offerings to reflect buyers' intended desires. In this way, the customized design service 100 allows products that reside deep in the "long-tail" of a market demand curve to become relevant by eliminating the search noise (e.g., random content or products of poor quality) that results from traditional color selection processes.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of customizing a user design project, the method comprising:

developing a compatibility profile for the user based on a set of inputs from the user for a set of preselected topics associated with the design project, wherein developing the compatibility profile comprises determining a color tolerance of the user for the design project, the color tolerance describing the user's ability or willingness to use a variety of colors for the design project and represented by at least one of saturation of color within the design project and quantity of different colors within the design project;

determining one or more lighting sources for the design project responsive to the user's compatibility profile, the one or more lighting sources being determined based on at least one of a geographic location of the design project and a direction of exposure of the design project;

influencing, by a computer processor, the determined color tolerance for the user responsive to the one or more lighting sources for the design project by adjusting the color tolerance for the user to account for an influence of a determined lighting source on an undertone of a color;

selecting a palette of potential colors for the design project responsive to the influenced color tolerance in the user's compatibility profile;

deriving a signature color palette for the design project responsive to the palette of potential colors; and storing the signature color palette and compatibility profile in association with the design project.

2. The method of claim 1, wherein developing the compatibility profile further comprises:

receiving inputs from the user answering questions related to one or more topics from the set of topics consisting of: color, lighting, style, mood, geographic location of the design project and existing colors of a design space of the design project.

3. The method of claim 1, wherein developing the compatibility profile further comprises:

determining a set of attributes describing the design project; and determining a dominant style for the design project responsive to the set of attributes describing the design project;

wherein the palette of potential colors is selected responsive to the determined dominant style.

4. The method of claim 1, wherein selecting the palette of potential colors further comprises:

interacting with a color profiles database having profiles encoding expert knowledge describing a set of colors; and comparing the user's compatibility profile to the profiles of the set of colors; and selecting the palette of potential colors responsive to the comparison.

5. The method of claim 1, wherein selecting the palette of potential colors further comprises:

performing a regression-based analysis of the profiles of the set of colors in the color profiles database to select a subset of the colors that are compatible with the user's compatibility profile.

6. The method of claim 1, wherein deriving the signature color palette comprises:

presenting the palette of the potential colors to the user;

receiving colors selected by the user from the palette of the potential colors for the design project; and generating the signature color palette containing the user-selected colors.

7. The method of claim 1, further comprising:

accessing a product profile database, the product profile database storing marketing profiles for items offered by merchants describing aspects of the items that are associated with information within user compatibility profiles;

comparing the user's compatibility profile with the marketing profiles for the items;

selecting items offered by the merchants responsive to the comparison; and presenting the selected items to the user.

8. The method of claim 1, wherein the geographic location of the design project is specified by a latitude of the design project.

9. The method of claim 1, wherein influencing the determined color tolerance for the user responsive to the one or more lighting sources for the design project comprises:

expanding a color tolerance range for the user in one or more color directions responsive to the types of the one or more lighting sources for the design project.

10. The method of claim 9, wherein the color tolerance range is expanded in different color directions for different lighting sources.

11. A computer system for customizing a user design project, the system comprising:

a non-transitory computer-readable storage medium storing executable program code for performing steps comprising:

developing a compatibility profile for the user based on a set of inputs from the user for a set of preselected topics associated with the design project, wherein developing the compatibility profile comprises determining a color tolerance of the user for the design project, the color tolerance describing the user's ability or willingness to use a variety of colors for the design project and represented by at least one of saturation of color within the design project and quantity of different colors within the design project;

determining one or more lighting sources for the design project responsive to the user's compatibility profile, the one or more lighting sources being determined based on at least one of a geographic location of the design project and a direction of exposure of the design project;

influencing the determined color tolerance for the user responsive to the one or more lighting sources for the design project by adjusting the color tolerance for the user to account for an influence of a determined lighting source on an undertone of a color;

selecting a palette of potential colors for the design project responsive to the influenced color tolerance in the user's compatibility profile;

deriving a signature color palette for the design project responsive to the palette of potential colors; and storing the signature color palette and compatibility profile in association with the design project; and a computer processor for executing the program code.

12. The system of claim 11, wherein developing the compatibility profile further comprises:

receiving inputs from the user answering questions related to one or more topics from the set of topics consisting of: color, lighting, style, mood, geographic location of the design project and existing colors of a design space of the design project.

13. The system of claim 11, wherein developing the compatibility profile further comprises:

determining a set of attributes describing the design project; and determining a dominant style for the design project responsive to the set of attributes describing the design project;

wherein the palette of potential colors is selected responsive to the determined dominant style.

14. The system of claim 11, wherein developing the compatibility profile further comprises:

determining a color tolerance of the user for the design project, the color tolerance describing the user's ability or willingness to use a variety of colors for the design project;

wherein the palette of potential colors is selected responsive to the determined color tolerance.

15. The system of claim 11, wherein selecting the palette of potential colors further comprises:

interacting with a color profiles database having profiles encoding expert knowledge describing a set of colors; and comparing the user's compatibility profile to the profiles of the set of colors; and selecting the palette of potential colors responsive to the comparison.

16. The system of claim 11, wherein selecting the palette of potential colors further comprises:
   performing a regression-based analysis of the profiles of the set of colors in the color profiles database to select a subset of the colors that are compatible with the user's compatibility profile.

17. The system of claim 11, wherein deriving the signature color palette comprises:
   presenting the palette of the potential colors to the user;
   receiving colors selected by the user from the palette of the potential colors for the design project; and
   generating the signature color palette containing the user-selected colors.

18. The system of claim 11, further comprising program code for:
   accessing a product profile database, the product profile database storing marketing profiles for items offered by merchants describing aspects of the items that are associated with information within user compatibility profiles;
   comparing the user's compatibility profile with the marketing profiles for the items;
   selecting items offered by the merchants responsive to the comparison; and
   presenting the selected items to the user.

19. A non-transitory computer-readable storage medium having executable computer program instructions recorded thereon for customizing a user design project, the computer program instructions comprising instructions for:
   developing a compatibility profile for the user based on a set of inputs from the user for a set of preselected topics associated with the design project, wherein developing the compatibility profile comprises determining a color tolerance of the user for the design project, the color tolerance describing the user's ability or willingness to use a variety of colors for the design project and represented by at least one of saturation of color within the design project and quantity of different colors within the design project;
   determining one or more lighting sources for the design project responsive to the user's compatibility profile, the one or more lighting sources being determined based on at least one of a geographic location of the design project and a direction of exposure of the design project;
   influencing the determined color tolerance for the user responsive to the one or more lighting sources for the design project by adjusting the color tolerance for the user to account for an influence of a determined lighting source on an undertone of a color;
   selecting a palette of potential colors for the design project responsive to the influenced color tolerance in the user's compatibility profile;
   deriving a signature color palette for the design project responsive to the palette of potential colors; and
   storing the signature color palette in association with the design project.

20. The computer-readable storage medium of claim 19, wherein the computer program instructions for developing the compatibility profile further comprise instructions for:
   receiving inputs from the user answering questions related to one or more topics from the set of topics consisting of: color, lighting, style, mood, geographic location of the design project and existing colors of a design space of the design project.

21. The computer-readable storage medium of claim 19, wherein the computer program instructions for selecting the potential colors further comprise instructions for:
   performing a regression-based analysis of the profiles of the set of colors in the color profiles database to select a subset of the colors that are compatible with the user's compatibility profile.

22. The computer-readable storage medium of claim 19, further comprising computer program instructions for:
   accessing a product profile database, the product profile database storing marketing profiles for items offered by merchants describing aspects of the items that are associated with information within user compatibility profiles;
   comparing the user's compatibility profile with the marketing profiles for the items;
   selecting items offered by the merchants responsive to the comparison; and
   presenting the selected items to the user.

* * * * *